United States Patent [19]

Zellner

[11] Patent Number: 4,515,765
[45] Date of Patent: May 7, 1985

[54] METHOD FOR THE PRODUCTION OF ANTIMONY OXIDE

[75] Inventor: Robert J. Zellner, Shaker Heights, Ohio

[73] Assignee: McGean-Rohco, Inc., Cleveland, Ohio

[21] Appl. No.: 564,926

[22] Filed: Dec. 23, 1983

[51] Int. Cl.³ ............................................. C01B 27/00
[52] U.S. Cl. ................................... 423/617; 422/158
[58] Field of Search .................................. 423/87, 617

[56] References Cited

U.S. PATENT DOCUMENTS

| | | | |
|---|---|---|---|
| 704,367 | 7/1902 | Plews | 423/617 |
| 1,096,468 | 5/1914 | Stark | 423/617 |
| 1,283,782 | 11/1918 | Ingham | 423/617 |
| 1,873,774 | 8/1932 | Listrat | 423/617 |
| 2,258,441 | 10/1941 | Bozarth | 423/617 |
| 3,944,653 | 3/1976 | Stewart et al. | 423/617 |

FOREIGN PATENT DOCUMENTS 345034  3/1931  United Kingdom ................ 423/87

Primary Examiner—John Doll
Assistant Examiner—Wayne A. Langel
Attorney, Agent, or Firm—Fay & Sharpe

[57] ABSTRACT

A process is provided for the production of antimony oxide from antimony sulfide which comprises the steps of comminuting the antimony sulfide to form a plurality of antimony sulfide containing particles, mixing the antimony sulfide containing particles with substantially pure oxygen, reacting the antimony sulfide with oxygen to form a gaseous stream of antimony oxide and sulfur dioxide, cooling the gaseous stream below the boiling point of antimony oxide, separating the condensed antimony oxide from the sulfur dioxide, further cooling the separated sulfur dioxide and utilizing the cooled sulfur dioxide to cool the gaseous stream of antimony oxide and sulfur dioxide. Apparatus for accomplishing this process is also provided.

6 Claims, 1 Drawing Figure

METHOD FOR THE PRODUCTION OF ANTIMONY OXIDE

BACKGROUND OF THE INVENTION

The present invention relates to the manufacture of antimony oxide and to apparatus used to produce the same.

Antimony oxide is a fine white powder often used as a pigment and/or employed as an ingredient in fire-retardant compositions. Frequently, it is manufactured from antimony sulfide for burning a sulfide containing ore in air. The burning is conventionally accomplished in a direct fired kiln or furnace by supplying heat obtained from the combustion of a gaseous hydrocarbon fuel in air. Antimony oxide vapor so-produced is quenched by mixing it with cooling air to develop a finely divided solid or powdery material. The powdery material is separated from the combustion products and coolant air which both contain large quantities of sulfur dioxide albeit in a relatively low concentration. Removing the sulfur dioxide from the gaseous stream is difficult and costly and often times leaves the sulfur dioxide in a form which cannot be economically isolated.

SUMMARY OF THE INVENTION

In the practice of the present invention, the antimony sulfide containing ore is burned in substantially pure oxygen to produce a concentrated stream of antimony oxide in sulfur dioxide. These combustion products are quenched to convert the antimony oxide vapor to a solid which is conveyed to a separating means to separate the antimony oxide solid from the sulfur dioxide gas. The sulfur dioxide gas stream then is cooled, which optionally may include liquefaction. This cooled or liquefied $SO_2$ is returned to quench the combustion products. The excess liquified sulfur dioxide is withdrawn for sale as a by-product.

Accordingly, it is the principal object of this invention to provide a process for manufacturing antimony oxide from antimony sulfide which comprises the steps of mixing the antimony sulfide with substantially pure oxygen, burning the finely divided antimony sulfide in the oxygen to form a gaseous stream of antimony oxide and sulfur dioxide, separating the antimony oxide from the sulfur dioxide by cooling the gaseous stream below the boiling point of antimony oxide, cooling the sulfur dioxide and utilizing the cooled sulfur dioxide to cool the gaseous stream of antimony oxide and sulfur dioxide.

Another object of the invention is to provide the process above including the step of quenching the hot antimony oxide-sulfur dioxide stream to condense the antimony oxide to a solid.

A further object of the invention is to provide the foregoing process including the steps of separating the antimony oxide solid from the gaseous sulfur dioxide, and then liquifying the separated sulfur dioxide.

A still further object of the invention is to provide a process which includes the step of quenching the sulfur dioxide antimony oxide vapor stream by mixing it with liquid sulfur dioxide.

It is also an object of this invention to provide an apparatus for manufacturing antimony oxide from antimony sulfide and oxygen which includes combustion means to oxidize the antimony sulfide to antimony oxide and sulfur dioxide, quenching means to accept the stream of vapor from the combustion means, separating means to remove the antimony oxide from the antimony oxide-sulfur dioxide stream, cooling means to reduce the temperature of the separated sulfur dioxide and recycle means to carry the cooled sulfur dioxide to said quench means, or, if desired, to the combustion means.

A further object of the invention is the provision of an apparatus as described above wherein the cooling means includes a liquifying means to convert the sulfur dioxide to the liquid state.

A still further object of the invention is the provision of an apparatus as previously described wherein the separating means is a baghouse having multiple fabric sleeves to separate the solid antimony oxide from the gaseous sulfur dioxide.

DETAILED DESCRIPTION OF THE PREFERRED EMBODIMENT OF THE INVENTION

Figure 1:
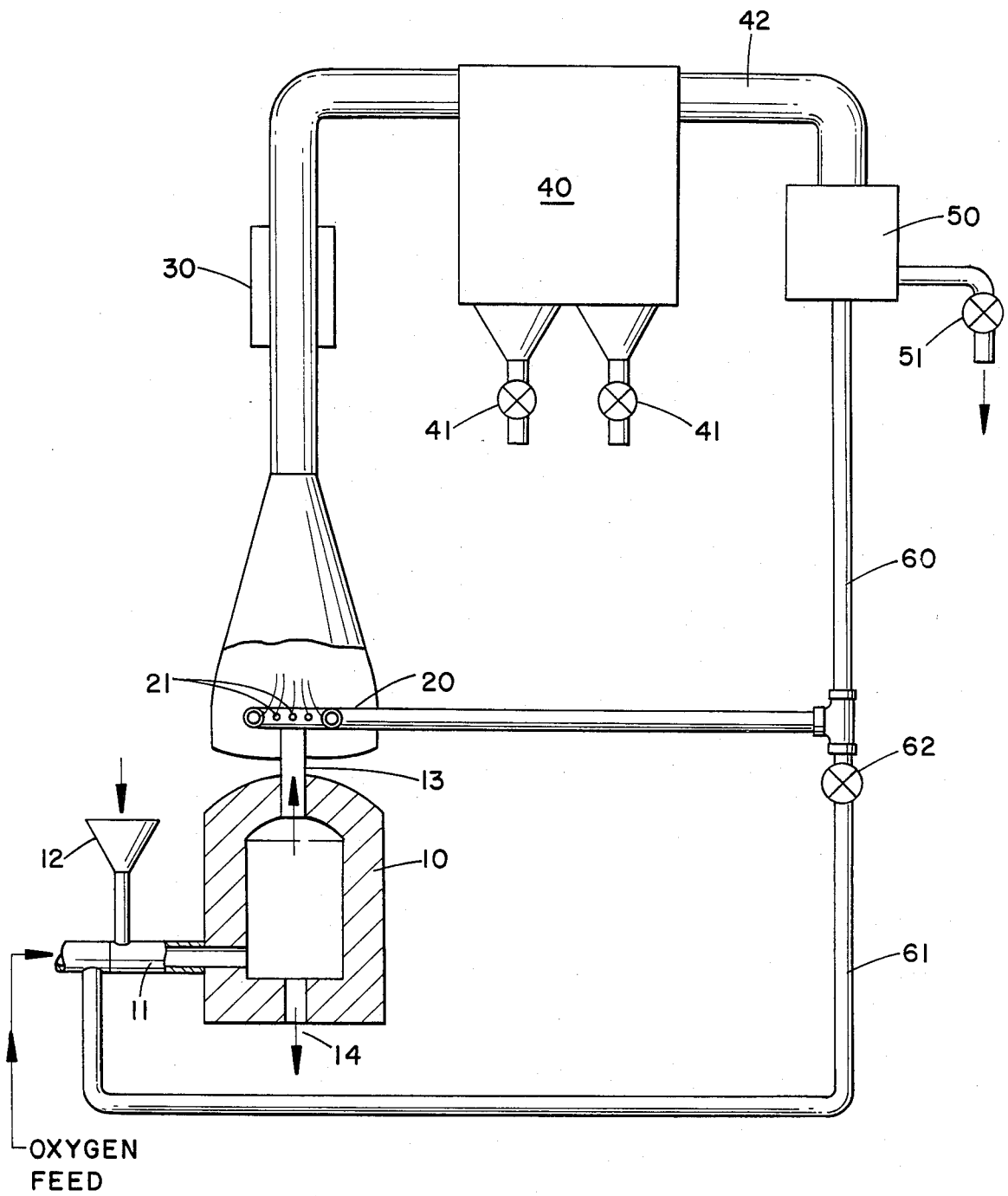

Referring now to the drawing wherein the showings are for the purpose of illustrating the preferred embodiment of the invention only and not for the purpose of limiting the same, the Figure shows an apparatus used in the practice of the present invention. Various components used in the practice of the instant invention are also illustrated.

A furnace (10) is provided for the reaction, by combustion, of antimony sulfide with essentially pure oxygen. The oxygen is fed into the burner or combustion chamber (11). The antimony sulfide is fed through hopper (12) into the burner. The antimony sulfide and oxygen react in the burner and the vaporized combustion products are then directed into the furnace chamber 15. Discharge conduit (13) leads the combustion products comprising sulfur dioxide and antimony oxide ($Sb_2O_3$) from the furnace to a quench or cooling means (20). Molten slag is discharged from the furnace at (14). In the quench zone the stream of sulfur dioxide vapor and antimony oxide are rapidly cooled to form antimony oxide particles which are conveyed in the sulfur dioxide stream. After quenching the temperature is further reduced in a cooler (30) which conveys the mixed stream to the baghouse (40) where the solids are separated from the sulfur dioxide gas. The solid antimony oxide is discharged through the star valves (41). The sulfur dioxide is conveyed by conduit (42) to a further cooler and liquifier (50) wherein a portion of the sulfur dioxide stream is discharged at (51) to product and the remainder is recycled by recycle pipe (60) to the quench means (20). If desired, the cooler (50) may include chillers to liquify the sulfur dioxide at atmospheric pressure or liquefaction may be accomplished by means of a compressor.

The reaction taking place in furnace (10) is as follows:

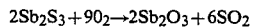

Sulfur dioxide is a colorless liquid with a density of 1.46 at its boiling point, which at atmospheric pressure is minus 10° C. (15° F.). Antimony oxide is a white powder which the handbook shows to have a boiling point of 1570° C. and a melting point of about 650° C. Antimony sulfide (stibnite) is a black crystalline compound.

In the practice of the present invention, the antimony sulfide is preferably in a finely divided state, substantially all of it being of a size able to pass through a 200 mesh screen and desirably about 75% of it passing through a 325 mesh screen. The temperature within the combustion chamber is desirably about 1800° F. to about 2000° F. Depending upon the purity of the antimony sulfide and the quantity of slag contained therein, it may be desirable to recycle combustion products, antimony oxide and/or sulfur dioxide, through the combustion chamber to control furnace temperature. Such recycle of sulfur dioxide may be by conduit or pipe (61), the quantity being controlled by valve (62).

The quenching means is a device designed to achieve rapid mixing between the combustion stream and a coolant stream at substantially lower temperature. For example, the gaseous discharge (13) from the furnace may lead combustion products through a ring (20) having orifices (21) on its interior and adapted to direct streams of coolant into the combustion stream. The quantity of coolant is controlled to reduce the temperature of the combustion products to 900° to 1000° F. The stream of antimony oxide and sulfur dioxide is further cooled in cooler (30) before entering the baghouse (40). In this regard, the temperature of the gaseous stream entering the baghouse is caused to be sufficiently low so that the filter bags are not adversely affected. As a practical matter, a temperature of 200° F. is quite satisfactory and some filter fabrics can tolerate higher temperature.

From the foregoing, it is clear that a unique method and apparatus have been provided which find utility in the production of antimony oxide from antimony sulfide.

While the invention has been described with reference to certain specific embodiments, it will be recognized by those skilled in the art that many variations are possible without departing from the spirit and scope of the invention.

What is claimed is:

1. A process for the production of antimony oxide from antimony sulfide which comprises the steps of comminuting the antimony sulfide to form a plurality of antimony sulfide containing particles, mixing the antimony sulfide containing particles with substantially pure oxygen, reacting the antimony sulfide with said oxygen to form a gaseous stream of antimony oxide and sulfur dioxide, cooling the gaseous stream below the boiling point of antimony oxide, separating the condensed antimony oxide from sulfur dioxide, further cooling the separated sulfur dioxide and utilizing at least a portion of the cooled sulfur dioxide to cool the gaseous stream of antimony oxide and sulfur dioxide, whereby disposition of substantially all of the sulfur dioxide is controlled so as to prevent substantial venting into the open atmosphere.

2. The process according to claim 1 including the step of quenching the hot gaseous stream of antimony oxide and sulfur dioxide to condense the antimony oxide to a solid.

3. The process according to claim 1 including the steps of separating the antimony oxide solid from the gaseous sulfur dioxide, and then liquifying the separated sulfur dioxide.

4. The process according to claim 3 including the step of cooling the sulfur dioxide and antimony oxide vapor stream by mixing it with liquid sulfur dioxide.

5. The process according to claim 1 wherein at least a portion of the gaseous stream of antimony oxide and sulfur dioxide is recycled with oxygen and antimony sulfide through the step of reacting said oxygen with said antimony sulfide.

6. The process according to claim 1 wherein at least a portion of said sulfur dioxide is collected and separated, and at least a portion of the sulfur dioxide is recycled to cool said gaseous stream of antimony oxide and sulfur dioxide.

* * * * *